United States Patent
Ozaki et al.

(10) Patent No.: US 6,239,833 B1
(45) Date of Patent: May 29, 2001

(54) REMOTE IMAGE MONITORING METHOD AND SYSTEM, AND RECORDING MEDIUM USED FOR EXECUTING IMAGE MONITORING

(75) Inventors: Nobuyuki Ozaki, Tokyo; Hiroshi Egi, Matsudo, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/265,389

(22) Filed: Mar. 10, 1999

(30) Foreign Application Priority Data

Mar. 18, 1998 (JP) .................................. 10-068667

(51) Int. Cl.$^7$ ...................................... H04N 7/18
(52) U.S. Cl. ............................................. 348/159
(58) Field of Search ...................... 348/142, 143, 348/149, 150, 152, 153, 154, 159, 160, 170, 17; 382/133; 244/161; H04N 7/18

(56) References Cited

U.S. PATENT DOCUMENTS

| | | | | |
|---|---|---|---|---|
| 5,729,471 | * | 3/1998 | Jain et al. ............................. | 348/514 |
| 5,751,339 | * | 5/1998 | Aramaki et al. ....................... | 348/17 |
| 5,806,802 | * | 9/1998 | Scott ................................. | 244/161 |
| 5,821,987 | * | 4/2000 | Larson ............................... | 348/19 |
| 5,825,432 | * | 10/1998 | Yonezawa ........................... | 348/563 |
| 5,926,209 | * | 7/1999 | Glatt ................................. | 348/143 |
| 5,993,001 | * | 11/1999 | Bursell et al. ....................... | 351/212 |
| 6,026,376 | * | 2/2000 | Kenney .............................. | 705/27 |
| 6,049,353 | * | 4/2000 | Gray ................................. | 348/159 |
| 6,061,089 | * | 5/2000 | Tokin et al. ......................... | 348/212 |
| 6,069,655 | * | 5/2000 | Seeley et al. ........................ | 348/154 |
| 6,091,771 | * | 7/2000 | Seeley et al. ........................ | 375/240 |
| 6,101,265 | * | 8/2000 | Bacus et al. ......................... | 382/133 |
| 6,101,536 | * | 8/2000 | Kotani et al. ........................ | 709/217 |
| 6,108,034 | * | 8/2000 | Kim ................................. | 348/154 |

FOREIGN PATENT DOCUMENTS

| | | |
|---|---|---|
| 0781049 A2 | 6/1997 | (EP) . |
| 8-251575 | 9/1996 | (JP) . |
| 08317378 | 11/1996 | (JP) . |
| 09116794 | 5/1997 | (JP) . |
| 10042279 | 2/1998 | (JP) . |
| WO 97/23096 | 6/1997 | (WO) . |

OTHER PUBLICATIONS

European Patent Office Communication, European Search Report, Application No. 99301957.9–2202, Feb. 21, 2000, 3 pages.

* cited by examiner

*Primary Examiner*—Chris Kelley
*Assistant Examiner*—Tung Vo
(74) *Attorney, Agent, or Firm*—Finnegan, Henderson, Farabow, Garrett & Dunner, L.L.P.

(57) ABSTRACT

A camera control unit selectively receives an image signal from at least one of a plurality of TV cameras in accordance with an operation signal sent from a monitoring PC over the Internet, compresses the image signal to a digital image, and transmits the compressed digital image to the monitoring PC and a monitor support apparatus over the Internet. The monitoring PC decodes the digital image sent over the Internet, displays the decoded image on a display, and monitors an object to be monitored. The monitor support apparatus successively saves the digital images sent over the Internet, and detects a condition variation of a specific region on the basis of the saved digital images.

2 Claims, 8 Drawing Sheets

REMOTE IMAGE MONITORING METHOD AND SYSTEM, AND RECORDING MEDIUM USED FOR EXECUTING IMAGE MONITORING

BACKGROUND OF THE INVENTION

The present invention relates to a remote image monitoring method and system for executing remote image monitoring with use of digitalized images of a TV camera, and to a recording medium for use in executing the remote image monitoring.

Remote image monitoring has conventionally been executed with use of TV cameras for many purposes and uses, for example, in order to monitor the operational states of equipment installed in various spots in plants, to check the entering in and exit from buildings of persons, and to confirm the possibility of danger.

When remote image monitoring is executed with use of TV cameras, TV cameras or objects to be controlled are installed on the spot side and a monitor apparatus is installed on a control room side, relatively near the objects to be controlled. Analog images of the TV cameras are displayed on the monitor apparatus via analog cables to constantly monitor the condition of the spot.

In the prior art, as mentioned above, the remote image monitoring in the control room is executed at all times. In recent years, however, it is desired for various reasons to execute monitoring with ease at locations other than the control room.

For example, it is desired that in preference for the health of monitoring workers or the comfort of working environment, the remote image monitoring be easily executed with use of personal computers, etc. at freely chosen places such as desks within offices or homes of monitoring workers. It is also desired, from the standpoint of reduction in personnel expenses of monitoring workers or in power consumption for monitoring, that the remote image monitoring be executed at night by a small number of monitoring workers with use of personal computers installed at a watchman room in a factory or accommodation facilities.

In order to achieve this, however, communication means suitable for remote image monitoring with use of TV cameras needs to be provided between the control room and monitor terminals. An example of conventional communication means is a network (Ether 10M, etc.). Specifically, there is an idea of using a TV meeting system in which a meeting is conducted while participants are viewing one another's image, by utilizing digital image distribution techniques available on the network.

However, the digital moving picture transmission executed in the TV meeting system is based on the digital moving picture compression system according to ITU-T-recommended H.261, wherein the image resolution of camera signals is "352×288" (in the case of CIF) or "176×144" (in the case of QCIF). The image resolution in this system is too low to be applied to the remote image monitoring in which the condition of the spot varies subtly due to a variation in environment.

As has been described above, the conventional system is merely applied in accordance with properties of communication media, and no special device is made. In addition, even if an existing network is to be applied to remote image monitoring, disturbance may be caused in the network and thus there is a problem the in application.

Under the circumstances, there is a demand for executing remote image monitoring with clear images, which can be executed in a freely chosen environment desired by monitoring workers at places other than the control room (e.g. desks within offices, homes of monitoring workers, branches, watchman rooms in factories, or accommodation facilities).

BRIEF SUMMARY OF THE INVENTION

Accordingly, it is an object of the present invention to provide a remote image monitoring method and system capable of easily executing remote image monitoring with clear images at places other than a control room by making use of a suitable network, and a recording medium for use in executing the remote image monitoring.

It is another object of the present invention to provide a remote image monitoring method and system capable of easily executing remote image monitoring with clear images by using personal computers, etc. in a freely chosen environment desired by monitoring workers, for example, on the desks within an office, in their homes, or at branches, and a recording medium for use in executing the remote image monitoring.

It is still another object of the present invention to provide a remote image monitoring method and system enabling remote image monitoring with clear images to be executed by a small number of monitoring workers with use of personal computers, etc. installed in a watchman room, accommodation facilities, etc., and a recording medium for use in executing the remote image monitoring.

According to one aspect of the present invention, there is provided a camera control unit provided in a remote image monitoring system for monitoring an object with use of a plurality of TV cameras, comprising: a camera controller for sending a camera switch control signal for selecting at least one of the TV cameras in accordance with an operation signal sent over the Internet, and operating a camera operating stand on which the selected TV camera is situated; and a digital encoder for selectively receiving an image signal of at least one of the TV cameras in accordance with the camera switch control signal, and compressing the received image signal to a digital image, the compressed digital image being transmitted over the Internet.

According to another aspect of the present invention, there is provided a remote image monitoring system for monitoring an object with use of a plurality of TV cameras, comprising: a camera control unit for selectively receiving an image signal of at least one of the TV cameras, compressing the image signal to a digital image, and transmitting the compressed digital image over the Internet; and a monitoring computer for decoding the digital image sent over the Internet, displaying the decoded image on a display, and monitoring the object.

In the system, the camera control unit may include a camera controller for selecting the TV camera associated with the image signal to be received, in accordance with an operation signal sent over the Internet, and operating the camera operating stand on which the selected TV camera is situated.

In the system, the monitoring computer may transmit the operation signal to the camera control unit over the Internet.

The system may further comprise a monitor support apparatus for successively saving the digital images sent over the Internet and detecting a condition variation of a specific region from the saved digital images.

In the system, the monitoring computer may access the monitor support apparatus and read out and display necessary digital image data from the saved digital image data.

In the system, the monitor support apparatus may include a database apparatus for successively saving the digital images transmitted over the Internet; and an intelligent function apparatus for detecting the condition variation from a current latest image saved in the database apparatus and an immediately previous image.

In the system, the intelligent function apparatus may include movement vector calculation means for calculating movement vectors of the current latest image and the immediately previous image; suppress function means for determining whether the movement vectors vary due to an operation of the TV camera, and if not, outputting a detection instruction; virtual master image storage means for storing in advance a normal-state image of a region of the object; and condition variation detection means for detecting the condition variation of the specific region from the normal-state image stored in the storage means and one of the current latest image and the immediately previous image, when the detection instruction has been received.

In the system, the intelligent function apparatus may further include message issue means for issuing a message when the condition variation detection means has detected the condition variation in the specific region; and storage means for storing data associated with the condition variation when the condition variation has been detected in the specific region.

In the system, the intelligent function apparatus may include three-dimensional position measuring means for detecting a condition variation for each of two TV cameras, when the two cameras are situated at a desired interval and monitor substantially the same object, and finding a three-dimensional position of a portion associated with the condition variation with use of images of the specific region obtained by the two TV cameras.

According to still another aspect of the present invention, there is provided a remote image monitoring method applied to a remote image monitoring system for monitoring an object with use of a plurality of TV cameras, comprising the steps of: selecting the TV camera associated with an image signal to be received, in accordance with an operation signal sent over the Internet from a monitoring computer, and operating a camera operating stand on which the selected TV camera is situated; and receiving the image signal of the selected TV camera, compressing the image signal to a digital image, and transmitting the compressed digital image to the monitoring computer over the Internet.

According to still another aspect of the present invention, there is provided a recording medium storing computer-executable program codes for executing remote image monitoring of an object on the basis of digital images successively received from a plurality of TV cameras over the Internet and saved, the program codes comprising: means for causing a computer to calculate movement vectors of the saved current latest image and an immediately previous image; means for causing a computer to determine whether the movement vectors vary due to an operation of the TV camera, and if the movement vectors vary due to the operation of the TV camera, execute no subsequent process, and if the movement vectors vary not due to the operation of the TV camera, output a detection instruction; means for causing a computer to detect a condition variation of a specific region from a normal-state image of a region of the object stored in advance in virtual master image storage means and one of the current latest image and the immediately previous image, when the detection instruction has been received; and means for causing a computer to issue a message when the condition variation has been detected in the specific region, and store data associated with the condition variation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A preferred embodiment of the present invention will now be described with reference to the accompanying drawings.

Figure 1:
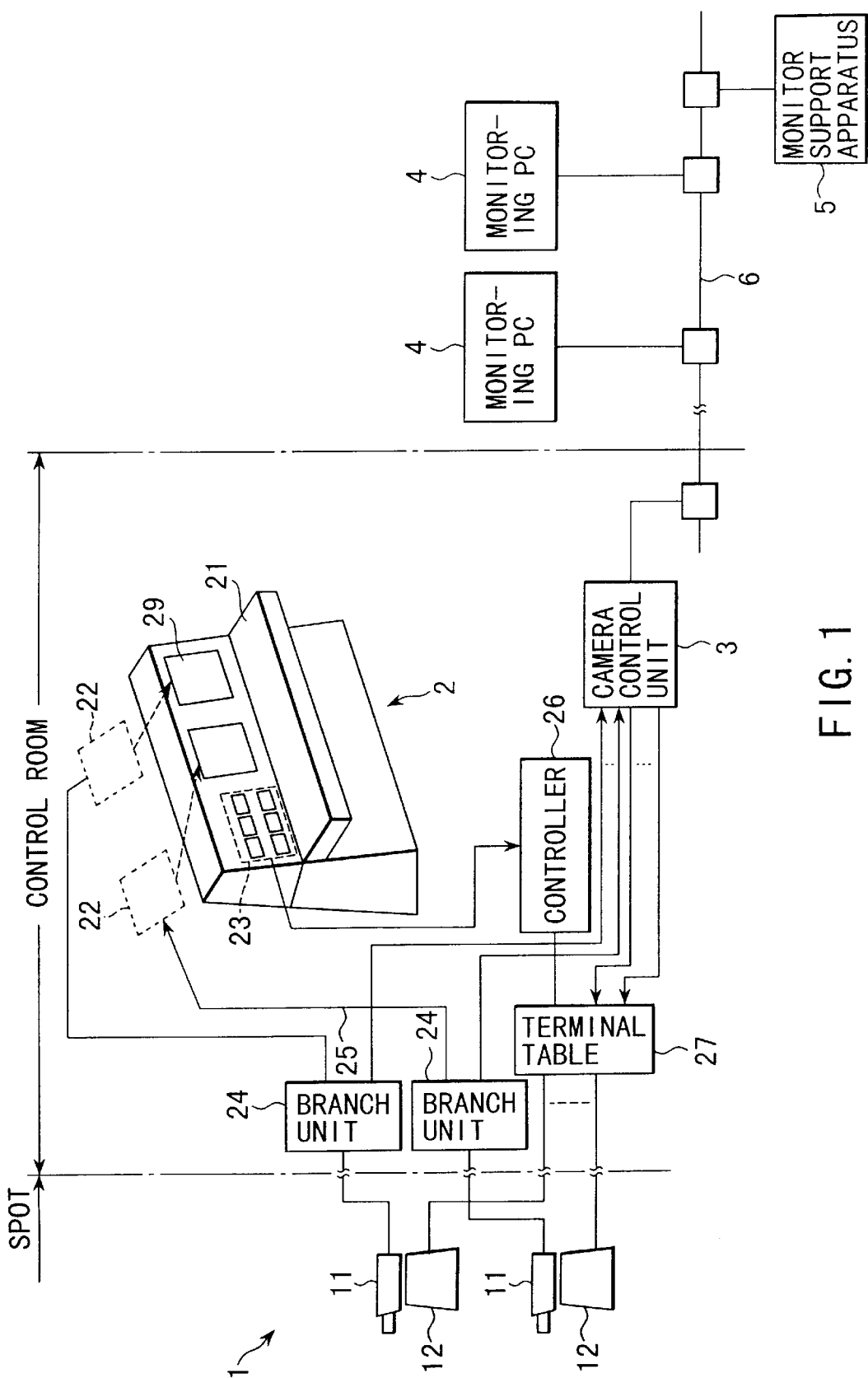
FIG. 1 shows a whole structure of a remote image monitoring system according to the present invention.

FIG. 1 shows a schematic structure of a remote image monitoring system according to the present invention.

The remote image monitoring system includes a spot-monitoring device 1 installed at locations to be monitored, such as a factory or a building; a monitor apparatus 2 for monitoring images received from the spot-monitoring apparatus 1; a camera control unit 3 for transmission of monitor images and for data conversion suitable for operations of the spot monitoring device; one or more monitoring personal computers (hereinafter referred to as monitoring PC) 4; and a monitor support apparatus 5. The camera control unit 3, monitoring PCs 4 and monitor support apparatus 5 are connected to the Internet 6 via necessary devices such as terminal adapters.

The spot monitoring device 1 is an already installed one or a newly installed one. The spot monitoring device 1 includes a plurality of industrial TV cameras (hereinafter "ITV camera") 11 for imaging the condition of the object to be monitored and producing analog image data in the form of NTSC (National Television System Committee) signals, and one or more camera operating stand 12 for vertically and horizontally moving and rotating the ITV cameras 11 such that the ITV cameras 11 face desired visual fields. In this embodiment, the analog image data is described as being NTSC signals. However, the analog image data may be PAL signals or SECAM signals.

The monitor apparatus 2 is installed in a control room located relatively near the spot for monitoring. The monitor apparatus 2 displays analog images from each ITV camera, thereby monitoring the condition of the objects to be monitored at the spot. The monitor apparatus 2 includes a plurality of displays 22 at an upper part of an operation table 21. The monitor apparatus 2 further includes an instrumentation monitor device 29 and an operation panel 23 on a monitor panel surface. The monitor apparatus 2 is connected to exclusive-use analog cables 25 extended from branch units 24 for branching monitor images from the ITV cameras 11. The branch units 24 branch analog images from the respective ITV cameras 11 and send them to the monitor apparatus 2 and the camera control unit 3. The operation panel 23 is provided with operation switches for controlling the movement of each ITV camera 11 in the vertical, horizontal and rotational directions.

Numeral 26 denotes a controller for controlling each camera operating stand 12. The controller 26 receives operation signals from the operation switches of the operation panel 23 and controls the movement and position of each camera operating stand 12 so that each ITV camera 11 may face a desired visual field.

Figure 2:
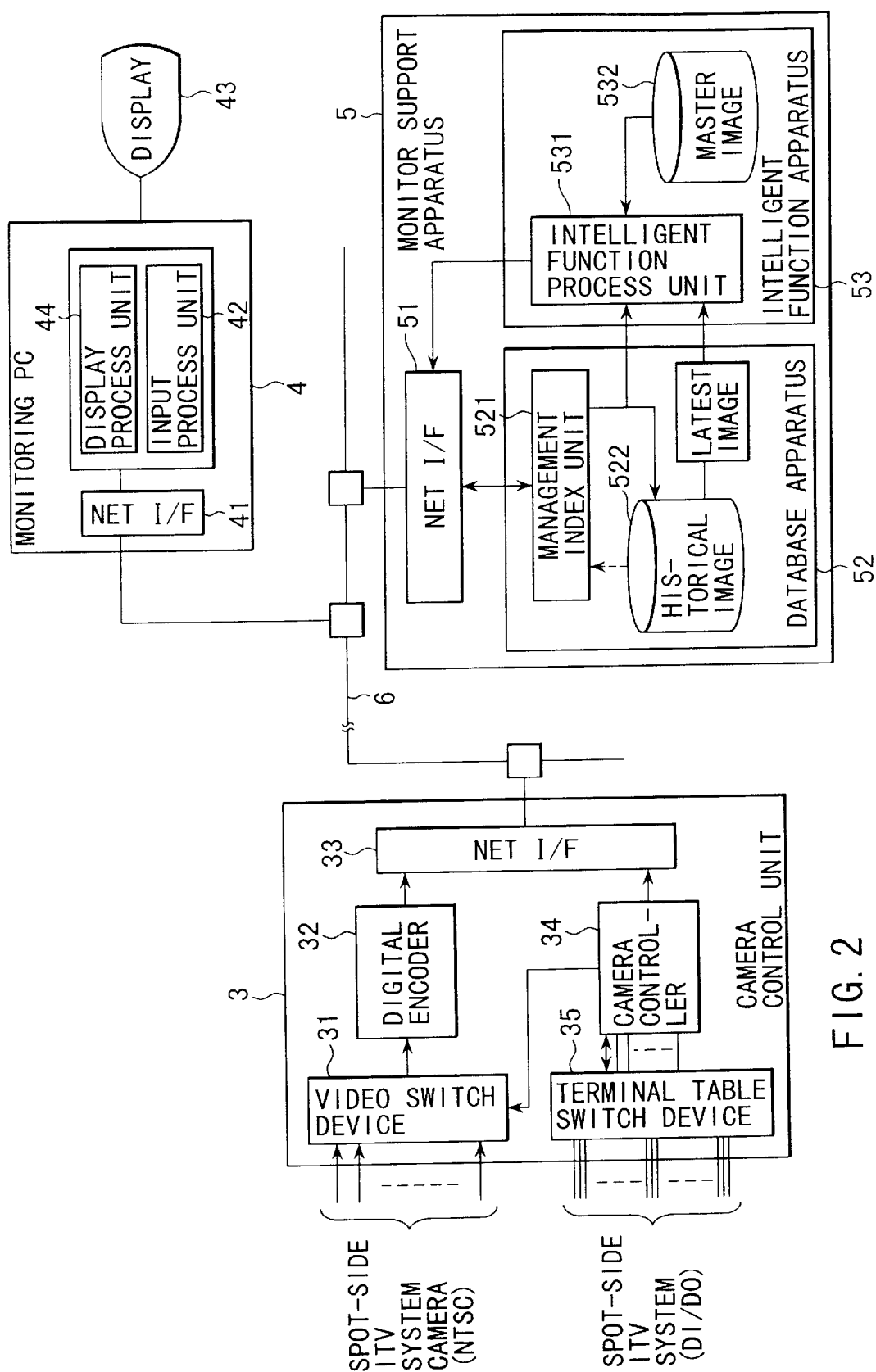
FIG. 2 shows a structure of an embodiment of the remote image monitoring system according to the invention.

The camera control unit 3, like the monitor apparatus 2, is located in the control room or at a suitable place which is relatively near the spot for monitoring. As is shown in FIG. 2, the camera control unit 3 includes a video switch device 31, a digital encoder 32, a net interface (I/F) 33, a camera controller 34 and a terminal switch device 35. The video switch device 31 successively receives the analog images or NTSC signals from the ITV cameras 11 in a predetermined order and outputs them, or selectively receives one of the NTSC signals and outputs it. The digital encoder 32 compression-processes the analog image from the video switch device 31 to produce a digital image with use of an image compression method such as JPEG. The net interface 33 receives and transmits the digital image and other data.

The camera controller 34 functions to determine the content of data input from the Internet 6 via the net interface 33, delivers to the video switch device 31 a switch control signal to select a specific ITV camera output or a switch control signal to select ITV camera outputs in a predetermined order, and delivers to the camera operating stand 12 an operation control signal for operating the ITV camera 11 to face a desired visual field.

The net interface 33 has a function of converting the signal from each camera operating stand 12 to a signal capable of data transfer and sending it to the Internet 6. In this embodiment the net interface 33 does not specify the destination of data transmission, but it may specify the monitor support apparatus 5 and specific monitoring PCs 4 as the destination.

The monitoring PCs 4 have the same functions. Thus, one of the monitoring PCs 4 will now be described representatively. The monitoring PC 4 is installed at a freely chosen place convenient for remote image monitoring, for example, on the desk within the office, in the home of a monitoring worker, at a branch office, at a watchman room in a factory, or in accommodation facilities. The monitoring PC 4 receives and displays the digital image sent from the camera control unit 3 over the Internet 6, or sends an operation signal for controlling the camera operating stand 12. The monitoring PC 4 includes a net interface 41, an input process unit 42 for decoding the received digital image by using a decoding method such as JPEG, and a display process unit 44 for displaying on a display 43 the decoded monitor image from each ITV camera 11.

The monitor support apparatus 5 has functions of successively receiving and saving digital images of the respective ITV cameras 11, detecting a variation in the condition of a specific region, issuing a message in accordance with the detection result, and recording data associated with the variation in the condition. The monitor support apparatus 5, like the monitoring PC 4, is installed at a freely chosen place convenient for monitor support, for example, on the desk within the office, in the home of a monitoring worker, at a branch office, at a watchman room in a factory, or in accommodation facilities.

The monitor support apparatus 5 specifically includes a net interface 51, a database apparatus 52 and an intelligent function apparatus 53. The database apparatus 52 functions as a server for storing and managing digital images of all ITV cameras 11 and reading out and transmitting the stored images in accordance with an access by the monitoring PC 4. The intelligent function apparatus 53 detects and records the condition variation of a specific region.

The database apparatus 52 includes a management index unit 521 for address-managing digital image data of each ITV camera, a historical image memory 522 for cyclically saving digital images of, e.g. past five days, and a data write/read control unit (not shown).

The intelligent function apparatus 53 includes an intelligent function process unit 531 and a master image memory 532 for storing normal-state images of objects to be monitored.

Figure 3:
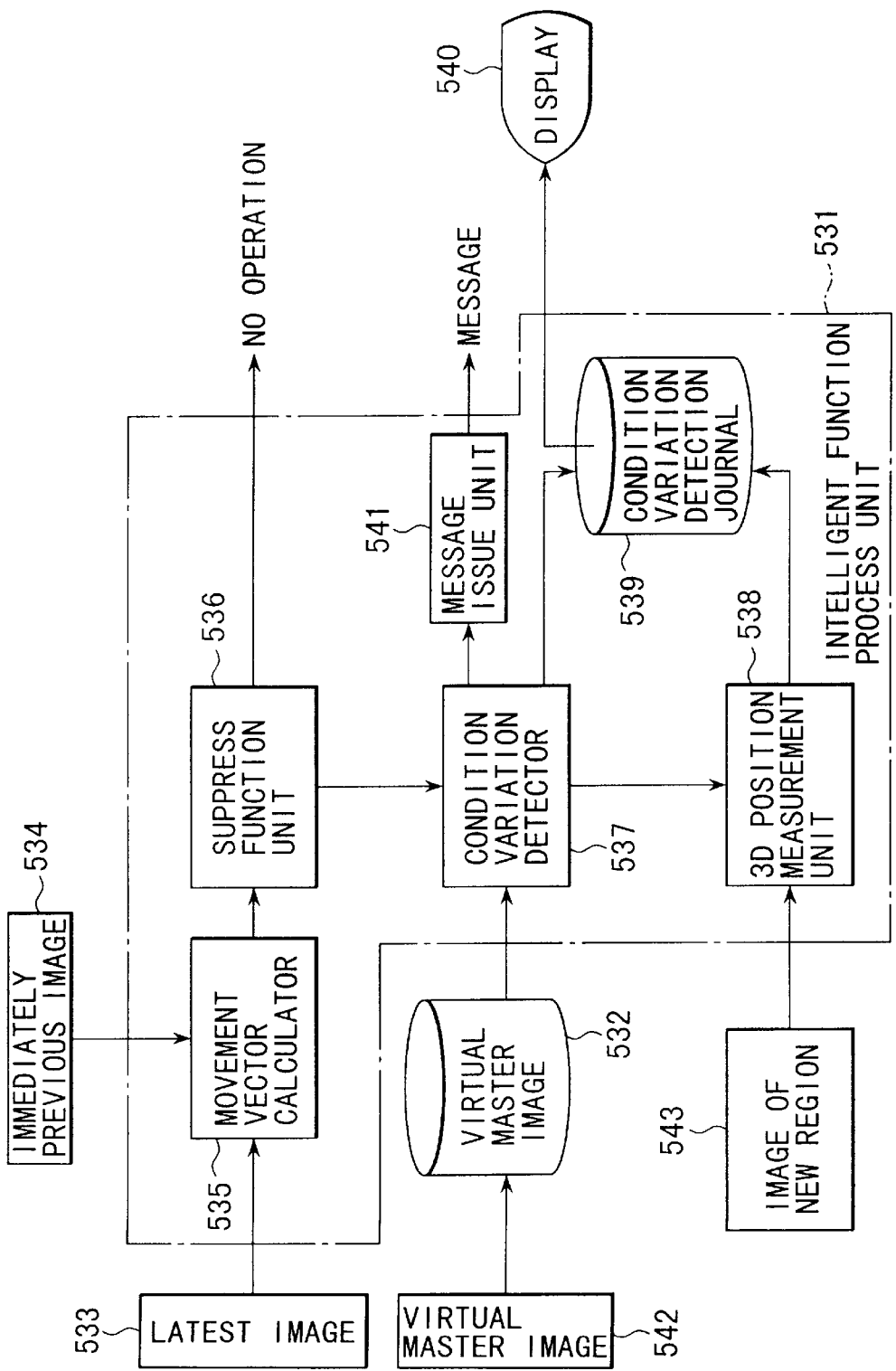
FIG. 3 is a functional block diagram for describing an intelligent function apparatus shown in FIG. 2.

The intelligent function process unit 531, as shown in FIG. 3, includes a movement vector calculator 535, a suppress function unit 536, a condition variation detector 537, a 3D position measurement unit 538, a condition variation detection journal memory 539, a display 540 and a message issue unit 541. The movement vector calculator 535 calculates vectors of movement of respective small-region images of a latest image 533 and an immediately previous image 534 saved in the historical image memory 522. The suppress function unit 536 determines whether the movement vectors calculated by the movement vector calculator 535 are those of movement due to the operation of the camera, and does not executed the subsequent process if the movement vectors are those of movement due to the operation of the camera and outputs a detection command if the movement vectors are not those of movement due to the operation of the camera. The condition variation detector 537 receives a determination result from the suppress function unit 536 and detects a region of a condition variation on the basis of the latest image 533 and a virtual master image. The 3D position measurement unit 538 detects a three-dimensional position of an abnormal object region when two ITV cameras are situated in parallel with a desired interval, e.g. 65 mm which is substantially equal to the distance between the eyes of the human being. The condition variation detection journal memory 539 stores the contents of the condition variation detector 537 and 3D position measurement unit 538 and other associated data. The display 540 displays the contents of the journal memory 539, and the message issue unit 541 issues a message such as an alarm in accordance with the detection result of the condition variation.

The display 540 may be the same as the display 43 or not, depending on the location of installation of the monitor support apparatus 5.

The relationship between the monitoring PC 4 and monitor support apparatus 5 is the same as the relationship between the client and server. Where necessary, the monitor support apparatus 5 is accessed to read out necessary historical images of the ITV camera or the content of the condition variation detection journal memory 539. The monitoring PC 4 can request in advance that the monitor support apparatus 5 issue a message to the monitoring PC 4 if the monitor support apparatus 5 has detected any condition variation. In this case, it is desirable that the monitor support apparatus 5 send, along with the message, associated information and images indicating the kind and degree of the condition variation.

The operation of the remote image monitoring system according to this embodiment will now be described.

Normally, the NTSC analog image, which is an output of each ITV camera 11, is branched by the associated branch unit 24 and sent to the associated display 22 of the monitor apparatus 2 and the camera control unit 3. In the control room, the monitoring worker monitors the condition of the spot, e.g. the operating state of factory equipment, through the display 22 of the monitor apparatus 2.

If the visual field of a specific ITV camera 11 needs to be vertically moved on the basis of the monitor result or due to necessity, this ITV camera 11 is designated and the associated operation switch on the operation panel 23 is operated. The monitor apparatus 2 sends an operation signal including camera discrimination data. The controller 26 selects an output terminal of the terminal stand 27 on the basis of the camera discrimination data and controls the operating stand 12 via the associated output terminal on the basis of the content of the operation signal. The designated ITV camera 11, while being controlled, monitors a desired monitor region. The analog image obtained from the ITV camera 11 at this time is sent to the monitor apparatus 2 via the branch unit 24, similarly with the above case, and displayed on the display 22.

Figure 4:
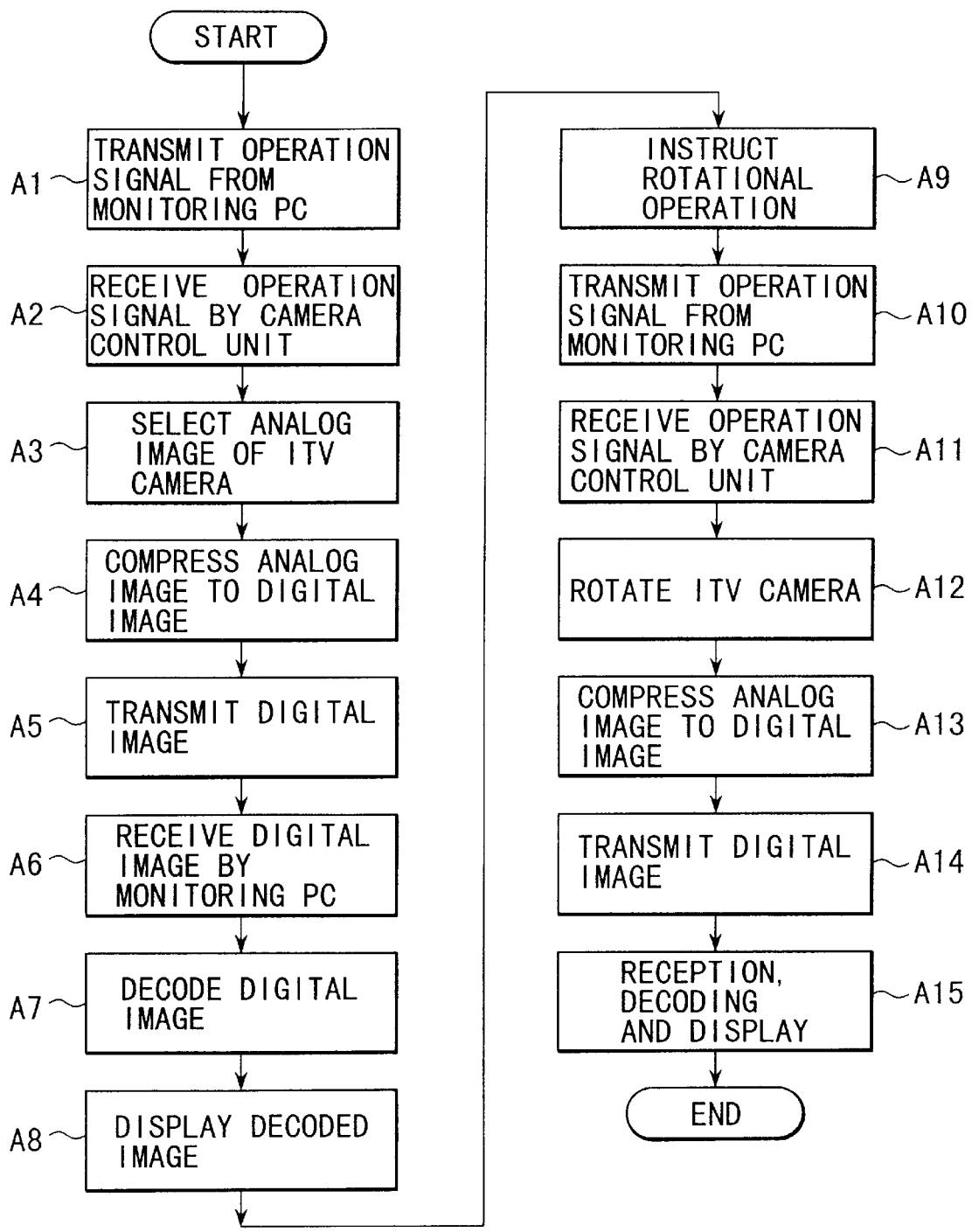
FIG. 4 is a flow chart illustrating a process executed by a camera control unit and a monitoring PC.

This remote image monitoring in the control room has conventionally been executed. On the other hand, as has been described above, there is a strong demand for easy remote image monitoring with use of personal computers, etc. in a freely chosen environment, e.g. on the desk in the office, in the home of the monitoring worker or at the branch office, or for remote image monitoring by a small number of monitoring workers with use of personal computers, etc. installed at a factory watchman room or accommodation facilities. In this invention, such a demand can be met by a process illustrated in FIG. 4.

At first, analog images output from all ITV cameras 11 are sent to the camera control unit 3 via associated branch units 24.

The monitoring PC 4 transmits over the Internet 6 an operation signal (including camera discrimination data designating specific ITV camera 11 or all ITV cameras 11) relating to image data acquisition (step A1). The camera control unit 3 receives the operation signal (step A2). The camera controller 34 determines the content of the received signal and sends a switch control signal to the video switch device 31.

The video switch device 31 successively selects the analog images of specific ITV camera 11 or the analog signals of all ITV cameras 11 in accordance with the switch control signal (step A3), and sends the selected analog images to the digital decoder 32.

The digital encoder 32 compression-processes the analog images selected and output by the video switch device 31 and produces corresponding digital images (step A4). The net interface 33 transmits over the Internet 6 the compressed digital image signals including the camera discrimination data (step A5). The digital images are transmitted, for example, by a frame-by-frame transmission method for still images.

In the monitoring PC 4 the input process unit 42 receives the digital images transmitted over the Internet 6 at high transmission speed (step A6).

The input process unit 42 decodes the received digital images by a coding method such as JPEG (step A7). The decoded original images are temporarily stored in a memory and then subjected to display processing in the display process unit 44. The display-processed images are displayed on the display 43 (step A8).

Accordingly, the monitoring worker can successively monitor the condition of the spot imaged by the specific ITV camera 11 or all ITV cameras 11, for example, in the watchman room, the office, or the home.

If the associated ITV camera 11 at the spot needs to be rotated, the monitoring worker issues a rotational operation instruction including camera discrimination data through the input process unit 42 (step A9). Thus, the monitoring PC 4 transmits over the Internet 6 the operation signal including the rotational operation instruction to the camera control unit 3 (step A10).

If the camera control unit 3 receives the operation signal (step A11), the camera controller 34 determines the content of the received signal, selects a proper one of the terminals of the terminal switch device 35, and sends a rotational operation control signal to the operating stand 12 of the associated ITV camera 11, thus rotating the ITV camera 11 (step A12).

Analog images of the ITV camera 11 obtained during and after the rotating operation are compressed to digital images by the encoder 32 (step A13). The compressed digital images are transmitted via the net interface 33 over the Internet 6 (step A14).

Like the above steps A6 to A8, the monitoring PC 4 receives the digital images over the Internet 6 and decodes and displays them (steps A15).

Thus, the monitoring PC 4 can monitor the condition of the spot at the time of the rotating operation on the basis of the images output from the ITV camera 11.

According to this system, the ITV camera 11 can be controlled by using one of the operation output from the operation panel 23 and the operation output from the monitoring PC 4.

The operational instruction from the monitoring PC 4 may be transmitted by a control signal of, e.g. an electronic text format and converted to an operation control signal by the camera controller 34, thereby to operate the operating stand 12.

On the other hand, the monitor support apparatus 5 successively receives digital images of the ITV cameras 11 transmitted from the camera control unit 3 at high speed and saves them in the historical image data memory 522 under index management by the management index unit 521.

When a plurality of ITV cameras 11 are connected to the camera control unit 3, the images of the respective ITV cameras 11 may be saved in one memory 522 at divided areas. Alternatively, memories may be prepared for respective ITV cameras, and the management index unit 521 may successively switch the memories for the respective cameras and save the images separately. On the other hand, in a case where there is another camera control unit, another line of the Internet may be used to receive and save the images in parallel.

As regards the cycle of receiving image data, the number of frames is preset to determine the number of images to be acquired in one second and the image data is received in accordance with the number of frames and saved in the memory. Accordingly, the refresh cycle of image data of one reference ITV camera 11 requires a time corresponding to (reception time of image data of one ITV camera 11)× (number of designated cameras).

The operation of the intelligent function apparatus 53 will now be described.

Figure 5:
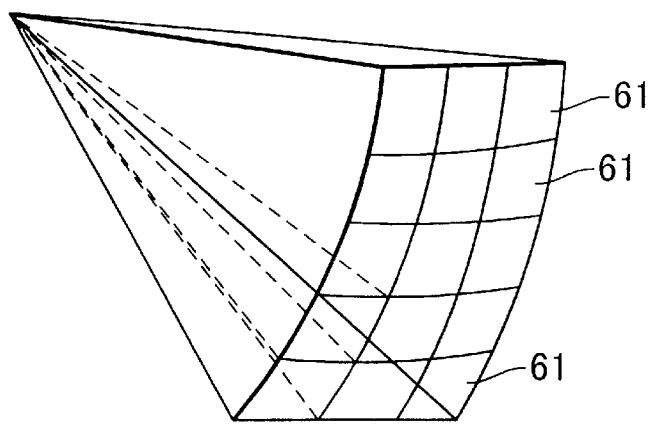
FIG. 5 is a view for explaining formation of a virtual master image with use of one ITV camera.

At first, normal images of objects to be monitored are stored in advance in the virtual master image memory 532. As regards the ITV camera 11 capable of vertical, horizontal and zooming operations, a plurality of images are acquired with the widest angle maintained while the ITV camera 11 is being operated vertically and horizontally. Thus, as shown in FIG. 5, a master image which can virtually cover the entire object to be monitored is prepared and stored. Specifically, each of rectangular areas 61 shown in FIG. 5 is an image obtained at each of visual field ranges when the ITV camera 11 is controlled vertically and horizontally. An image obtained by combining all these areas is a virtual master image of the entire region of the object to be monitored at the camera installation location.

Figure 6:
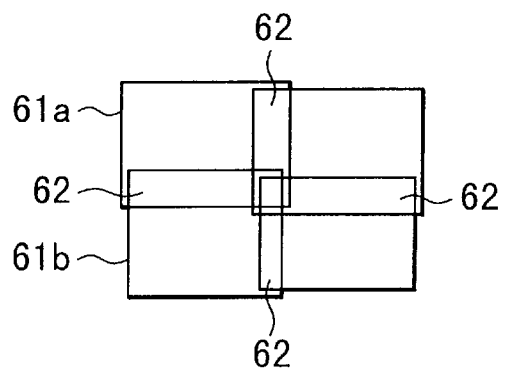
FIG. 6 is a view for explaining an overlapping portion in forming a virtual master image with use of one ITV camera.
Figure 7:
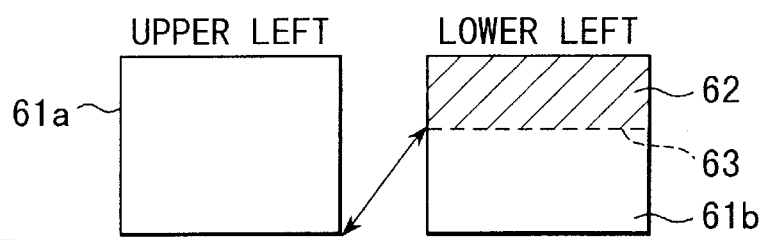
FIG. 7 is a view for explaining an example of deletion of an overlapping portion in forming a virtual master image.

Specifically, when the virtual master image is formed, the position of the ITV camera 11 is varied in units of a predetermined angle in the vertical and horizontal directions. As a result, as shown in FIG. 6, some overlap portions 62 of the visual field images occur. Referring to FIG. 7, a left-hand visual field image 61a corresponds to the upper left visual field in FIG. 6, and a right-hand visual field image 61b corresponds to the lower left visual field in FIG. 6. In this case, an overlap portion 62 between the visual field images 61a and 61b, as indicated by hatching lines, occurs at the visual field image 61b.

In order to delete the overlap portion 62, a correlation check is conducted as described below.

The correlation between each of row-unit images of the right-hand visual field image 61b and a lowest-row image of the left-hand visual field image 61a is successively examined, with the row-unit images of the image 61a being examined from the uppermost one in a descending order. Thereby an image overlap row 63 is specified. All upper row-unit images above the row 63 are deleted, and the images 61a and 61b are coupled. Thus, the virtual master image is prepared. The obtained virtual master image 542 is stored in the virtual master image memory 532, as shown in FIG. 3.

Figure 9:
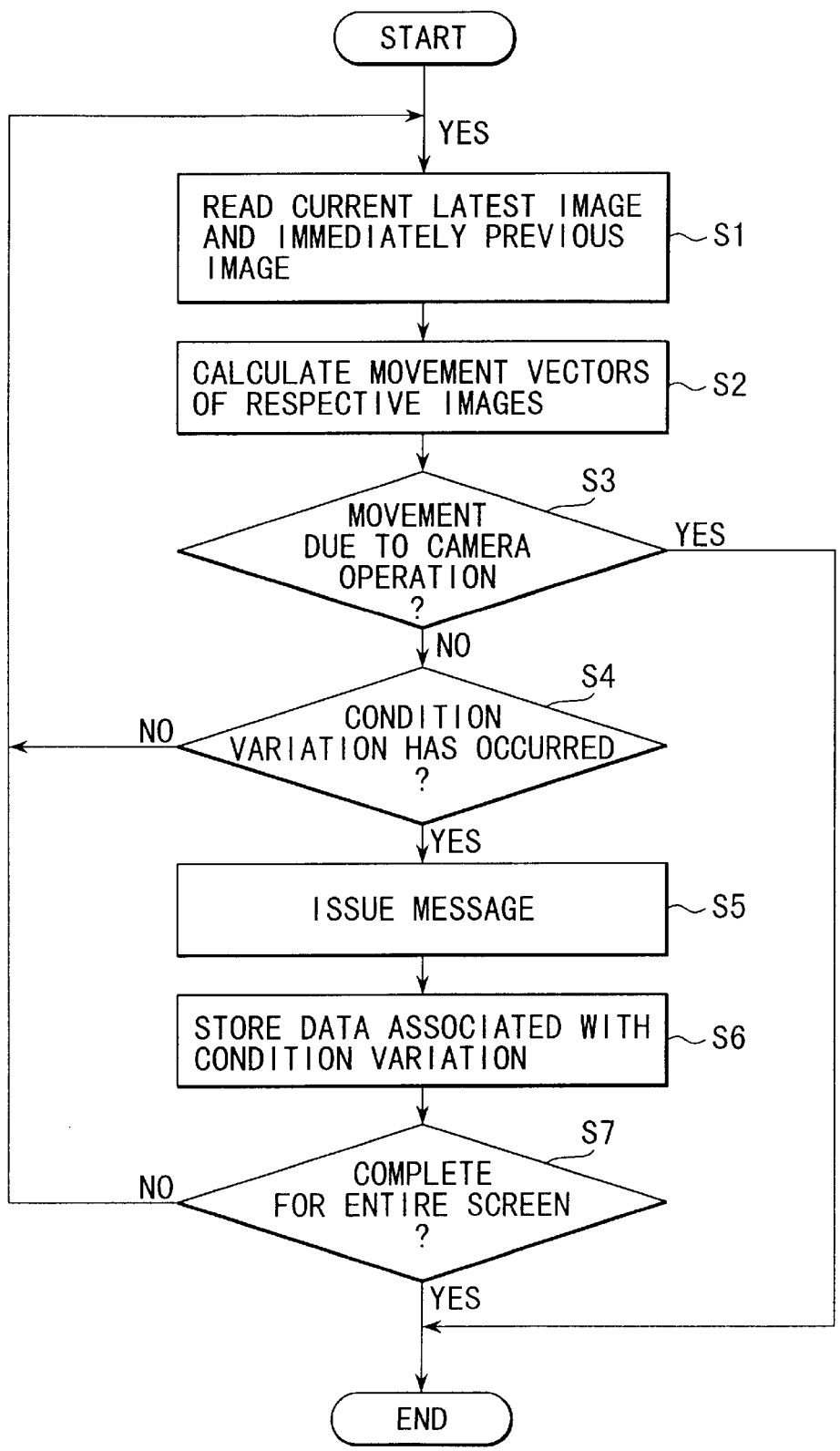
FIG. 9 is a flow chart illustrating a process executed by the intelligent function apparatus.

After the virtual master image 542 is stored in the virtual master image memory 532 in advance, the intelligent function apparatus 53 executes a process illustrated in FIG. 9.

The movement vector calculator 535 receives two images, i.e. the immediately previous image 534 and the latest image 533 of the historical image memory 522 (step S1). The movement vectors of each image are calculated (step S2) and sent to the suppress function unit 536. The suppress function unit 536 determines whether the movement vectors are those due to the movement of the ITV camera 11 (step S3).

Figure 8:
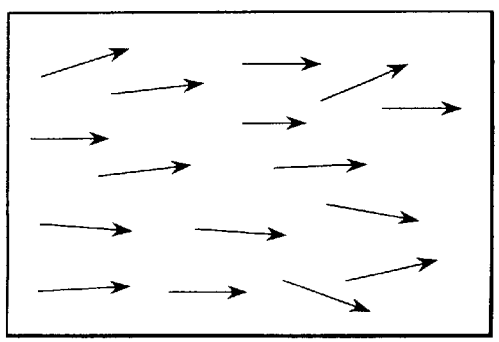
FIG. 8 is a view for explaining movement vectors obtained from a digital image of the ITV camera.

For example, if the images in the screen have vectors in substantially the same direction, as shown in FIG. 8, it is highly possible that the images vary due to vertical, horizontal or zooming movement of the ITV camera 11. In this case, the movement of the camera is determined, and the subsequent process is not executed.

On the other hand, if it is determined that the images vary not due to movement of the camera, the condition variation detector 537 determines whether there is a variation in the condition (step S4).

The condition variation detector 537 examines to which portion of the virtual master image the immediately previous image or the current latest image corresponds. Specifically, the degree of correlation is calculated, for example, between the current latest image and the image of a predetermined block unit in the virtual master image memory 532, and a region is specified. The image of this specified region and the received latest image are compared to detect a condition variation. For example, by calculating the correlation between both images, a new region on the received image is found. The new region is defined as corresponding to a condition variation which does not appear on, e.g. the virtual master image.

If there is no condition variation in the specified region, the control returns to step S1 and the same process is repeated. On the other hand, if there is a condition variation in the specified region, the condition variation detector 537 retrieves from the historical image memory 222 the data relating to the reception time of the latest image, the camera and the previous and following images of the image in question, and saves the retrieved data in the condition variation detection journal memory 539. On the other hand, the condition variation detector 537 enables the message issue unit 541 to issue a message such as an alarm (step S5), thereby notifying the monitor apparatus 2 in the control room and all monitoring PCs 4 of the condition variation over the Internet 6, etc. In this case, it is desirable that along with the message, associated information and images indicating the kind and degree of the condition variation be issued at the same time. Thereby, the monitoring workers can understand the condition variation and take proper measures in accordance with the kind and degree of the condition variation.

In the case where a plurality of ITV cameras 11 are situated in parallel at desired intervals, e.g. 65 mm which is substantially equal to the distance between the eyes of the human being, and the ITV cameras 11 monitor similar objects, the 3D position measurement unit 538 measures the three-dimensional position of the new region appearing as the condition variation by using two images 543 of the new region. The positions of the cameras calibrated in advance, the current camera parameters are calculated from the corresponding region on the previously calculated virtual master image, and a variation component is found from the reference position. Thereby, the current positional relationship is re-calculated. Using the positional relationship, the 3D position on the corresponding region of the ITV camera can be found by the principle of triangular survey. As result, data on "where the abnormality has occurred", in addition to the aforementioned data, can be stored in the condition variation detection journal memory 539.

Moreover, region limitation data on a region, a condition variation of which needs to be monitored, is for example, camera discrimination data, is sent from the monitoring PC 4 to the monitor support apparatus 5. Thereby, the intelligent function apparatus 53 can detect the condition variation with respect to the historical image data consisting of only the camera discrimination data.

Furthermore, data on the condition variation is stored in the condition variation detection journal memory 539 (step S6). It is determined whether a condition variation check has been completed with respect to the entire region of the image screen (step S7). If the check has not been completed, the control returns to step S1 and the same process is repeated. If the check has been completed, the entire process is finished. Thus, the images before and after the time of occurrence can be checked, while the past journal is viewed on the display 540.

According to the above embodiment, the image of the ITV camera 11 is branched, and one of the branched images is sent to the monitor apparatus 2 of the control room located near the spot and the other to the camera control unit 3. The unit 3 compresses the analog image to the digital image. Thus, the monitor image can be smoothly transmitted without causing disturbance in the Internet 6. Moreover, the image with enhanced image resolution can be sent to the monitoring PC 4.

Since the condition of the spot can be monitored by the monitoring PC 4 over the Internet 6, when the number of monitoring workers in the control room needs to be reduced, for example, at midnight, the condition of the spot can be monitored by the monitoring PC 4 installed at a remote location over the Internet 6. The monitoring work can be smoothly executed.

The data for selecting the camera or the data for controlling the camera operating stand 12 can be transmitted from the monitoring PC 4. Thus, images can be acquired selectively from any of the plural ITV cameras 11, and images of the object in the desired visual field can be acquired and monitored.

Besides, the intelligent function apparatus 53 of the monitor support apparatus 5 successively saves digital images of the specific or all ITV cameras 11 delivered over the Internet 6. The saved latest image is compared with the normal-state image of the object to be monitored, which is stored in advance, and the condition variation of the specific region is detected. Thus, the condition variation of the specific region can be properly detected, and when the condition variation has been detected, a message is issued or the data associated with the condition variation is stored and displayed where necessary. Thus, the location and time of the occurrence of the condition variation can be easily understood.

An embodiment of a recording medium according to the present invention will now be described with reference to the accompanying drawings.

Figure 10:
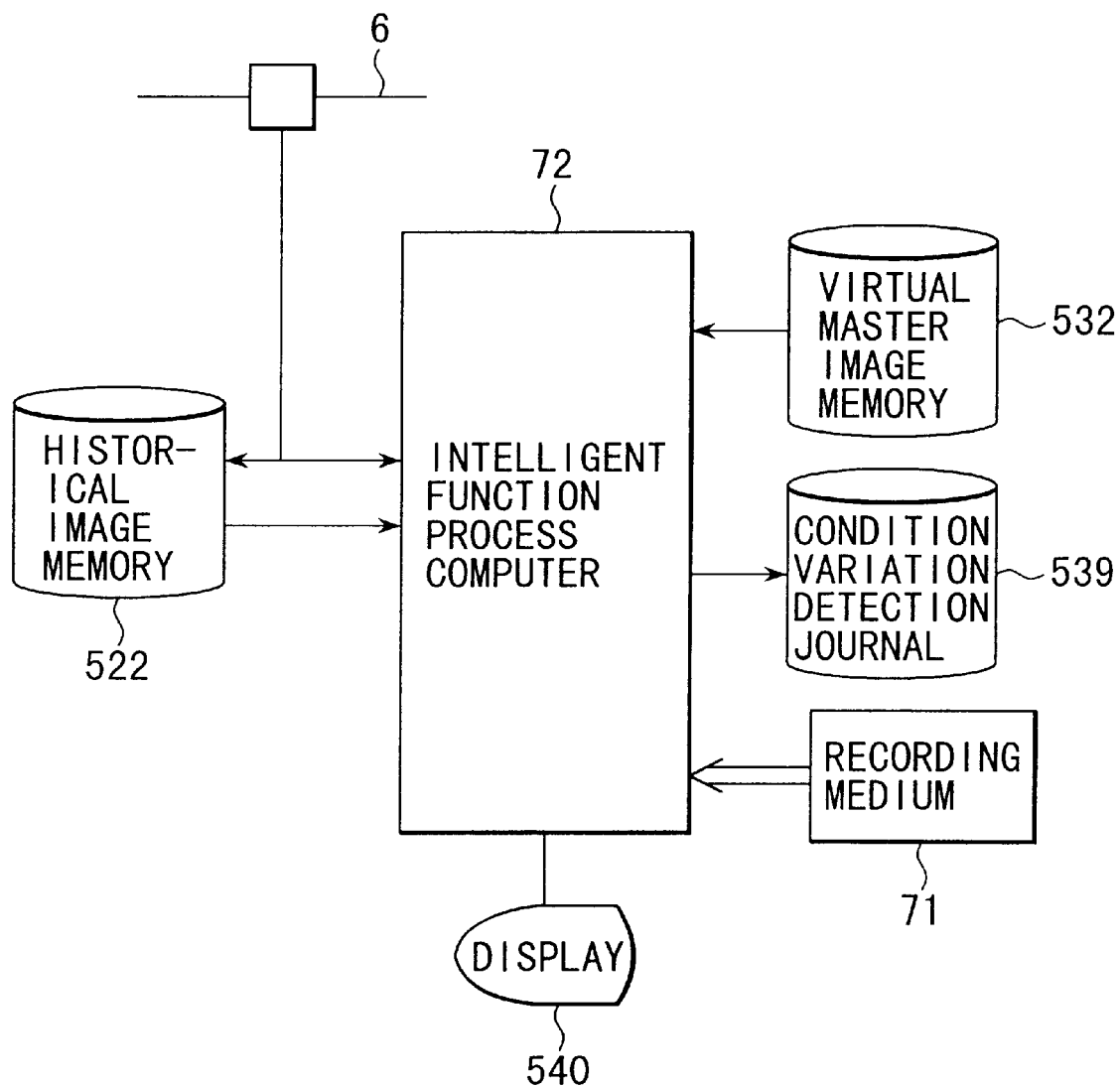
FIG. 10 shows a system configuration of the intelligent function apparatus using a recording medium according to the present invention.

FIG. 10 shows a structure wherein the intelligent function process is achieved by introducing a computer into the intelligent function apparatus 53 in the monitor support apparatus shown in FIG. 2. Specifically, the intelligent function apparatus 53 is provided with a recording medium 71 for recording a program for executing an intelligent function process illustrated in FIG. 11 and a computer 72 for reading the program from the recording medium 71 and achieving the intelligent function process, in addition to the virtual master image memory 532 for storing normal-state images of the objects to be monitored and the condition variation detection journal memory 539.

The recording medium 71 may be, for example, a magnetic disk (floppy disk, hard-disk, etc.), an optical disk (CD-ROM, DVD-ROM, CD-R, etc.), a magneto-optical disk (MO), a memory card, or a semiconductor memory.

Figure 11:
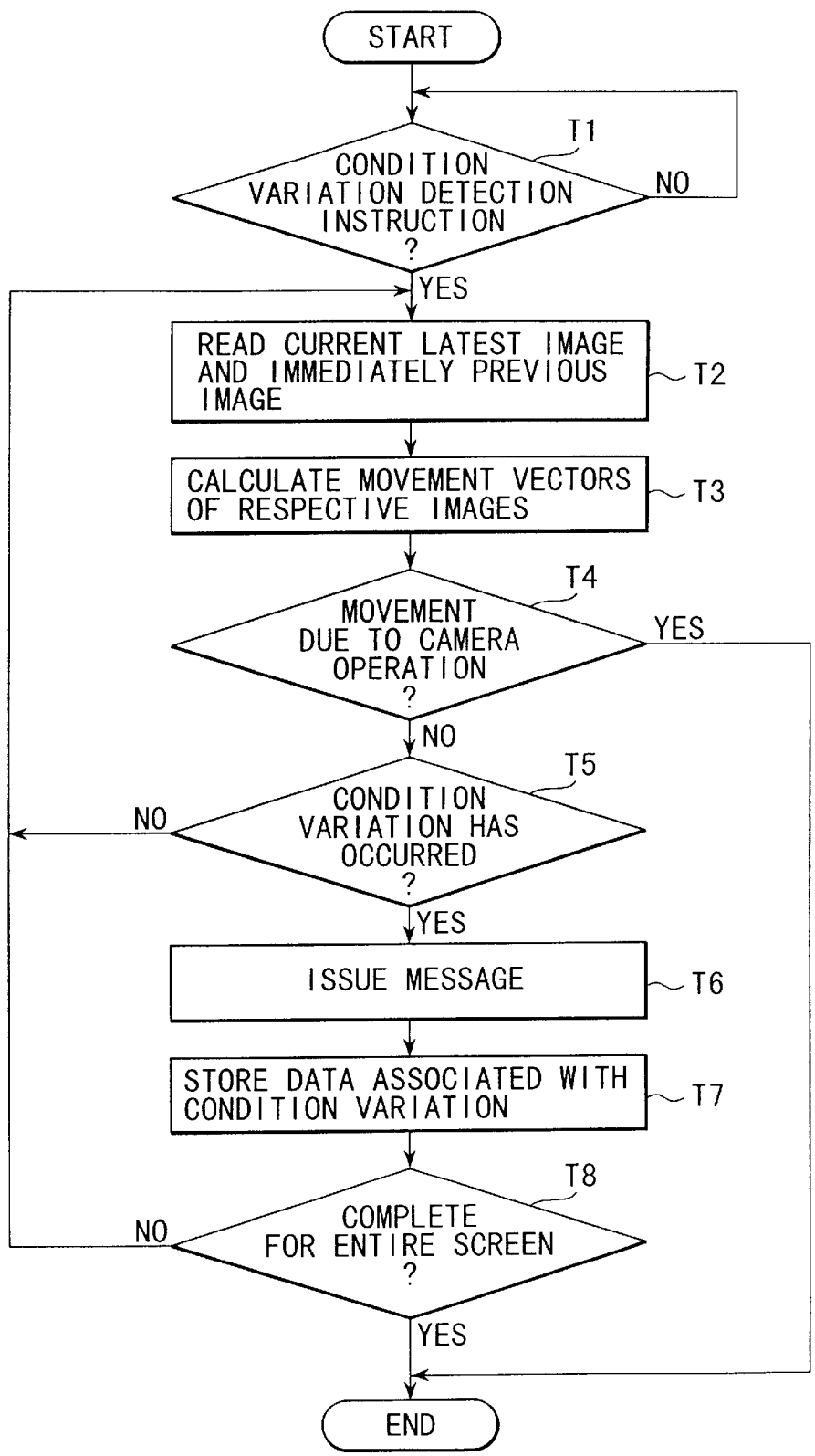
FIG. 11 is a flow chart illustrating a process which an intelligent function process computer shown in FIG. 10 executes by reading a program from the recording medium.

The computer 72 reads the program codes recorded on the recording medium 71 and carries out the intelligent function process as shown in FIG. 11. Specifically, when a condition variation detection instruction is input from, e.g. the outside (e.g. monitoring PC 4) (step T1), the immediately previous image is taken in and reads the current latest image from the historical image memory 522 (step T2). The computer 72 calculates movement vectors of the immediately previous image and the latest image (step T3).

Then, it is determined whether the movement vectors of the two images are due to movement of the ITV camera 11 (step T4). For example, if the images in the screen have vectors in substantially the same direction, as shown in FIG. 8, it is highly possible that the images vary due to vertical, horizontal or zooming movement of the ITV camera 11. In this case, the movement of the camera is determined, and the subsequent process is not executed.

On the other hand, if it is determined that the images vary not due to movement of the camera, a condition variation of a specific region is detected (step T5). In this detection of the condition variation, it is determined to which portion of the virtual master image the immediately previous image or the current latest image corresponds. Specifically, the degree of correlation is calculated, for example, between the current latest image and the image of a predetermined block unit in the virtual master image memory 532, and a region is specified. The image of this specified region and the received latest image are compared to detect a condition variation.

If there is no condition variation in the specified region, the control returns to step T2 and the same process is repeated. On the other hand, if there is a condition variation in the specified region, a message such as an alarm is issued (step T6) and the reception time of the latest image, the camera discrimination data and the previous and following images of the image in question are retrieved from the historical image memory 522 and saved in the condition variation detection journal memory 539 (step T7).

It is determined whether a condition variation check has been completed with respect to the entire region of the image screen (step T8). If the check has not been completed, the control returns to step T2 and the same process is repeated. If the check has been completed, the entire process is finished.

The above process may be executed at all times, instead of being executed by the condition variation detection instruction issued from the outside.

The above process may be executed with respect to the images of the ITV camera 11 designated by, e.g. the monitoring PC 4, or the images of all ITV cameras 11.

According to the embodiment of the recording medium, the movement vectors of the current latest image saved in the database apparatus 52 and the immediately previous image are calculated. If the movement vectors vary due to the condition variation, and not due to the control of the ITV camera, the associated region is specified, and a message is automatically issued or data associated with the condition variation is recorded. Thus, the condition of the spot can be observed at any time, and if necessary a message may be issued to the control room or proper measures can be taken at the spot.

As has been described above, according to the present invention, easy remote image monitoring with clear images can be executed at locations other than the control room.

In addition, easy remote image monitoring with clear images can be executed with use of personal computers, etc. in a freely chosen environment, e.g. on the desk in the office, in the home of the monitoring worker or at the branch office. Furthermore, remote image monitoring with clear images can be executed by a small number of monitoring workers with use of personal computers, etc. installed at a factory watchman room or accommodation facilities.

The TV camera image is compressed to the digital image by the image compression process such as JPEG and the digital image is transmitted. Thus, the monitor image can be transmitted at high speed. Even if the environment of the spot varies, remote monitoring can be executed with enhanced image resolution.

Since the remote image monitoring can be executed at desired places by using not only the monitor apparatus in the control room but also the Internet, the monitoring work can be flexibly executed in consideration of the demand of monitoring workers and the monitoring work can be smoothly carried out.

According to the system of this invention, the monitoring can be quickly and easily carried out not only with use of newly installed TV cameras but also with use of the TV cameras already installed at the spot, even if a new TV camera is not installed.

According to the recording medium of the present invention, the condition variation can be exactly detected from the movement of the monitored object at the spot. If the condition variation is detected, a message can be automatically issued and the data associated with the condition variation is recorded. Thus, the condition of the spot can be monitored at any time. Furthermore, a message can be issued to the spot-side control room, or proper measures can be quickly taken at the spot.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A remote image monitoring system for monitoring an object with use of a plurality of TV cameras, comprising:

a camera control unit for selectively receiving an image signal of at least one of the TV cameras, compressing the image signal to a digital image, and transmitting the compressed digital image over the Internet;

a monitoring computer for decoding the digital image sent over the Internet, displaying the decoded image on a display, and monitoring the object; and a monitor support apparatus for successively saving the digital images sent over the Internet and detecting a condition variation of a specific region from the saved digital images, wherein the monitor support apparatus includes a database apparatus for successively saving the digital images transmitted over the Internet; and an intelligent function apparatus for detecting the condition variation from a current latest image saved in the database apparatus and an immediately previous image, wherein the intelligent function apparatus includes movement vector calculation means for calculating movement vectors of the current latest image and the immediately previous image;

suppress function means for determining whether the movement vectors vary due to an operation of the TV camera, and if not, outputting a detection instruction;

virtual master image storage means for storing in advance a normal-state image of a region of the object; and condition variation detection means for detecting the condition variation of the specific region from the normal-state image stored in the storage means and one of the current latest image and the immediately previous image, when the detection instruction has been received.

2. The system according to claim 1, wherein the intelligent function apparatus further includes:

message issue means for issuing a message when the condition variation detection means has detected the condition variation in the specific region; and storage means for storing data associated with the condition variation when the condition variation has been detected in the specific region.

* * * * *